United States Patent
Comb et al.

(10) Patent No.: US 8,153,182 B2
(45) Date of Patent: Apr. 10, 2012

(54) ADJUSTABLE HEAD MOUNT FOR DIGITAL MANUFACTURING SYSTEM

(75) Inventors: James W. Comb, Hamel, MN (US); Troy M. Coolidge, Victoria, MN (US); Robert E. Styer, Apple Valley, MN (US)

(73) Assignee: Stratasys, Inc., Eden Prairie, MN (US)

(*) Notice: Subject to any disclaimer, the term of this patent is extended or adjusted under 35 U.S.C. 154(b) by 776 days.

(21) Appl. No.: 12/255,289

(22) Filed: Oct. 21, 2008

(65) Prior Publication Data

US 2010/0100224 A1    Apr. 22, 2010

(51) Int. Cl.
*B29C 41/02* (2006.01)
*B05B 3/00* (2006.01)

(52) U.S. Cl. ............ 427/8; 118/305; 118/308; 118/323; 118/500; 264/313; 427/258; 427/264; 427/427; 427/427.1; 427/427.3; 700/98; 700/118; 700/119

(58) Field of Classification Search .............. 118/44, 118/170, 220, 222, 300, 323, 305, 308, 500; 222/516, 517; 239/264, 265, 750, 751; 264/145, 264/146, 148, 176.1, 259–264, 266, 299, 264/308, 309, 313, 316; 425/90, 114; 427/8, 427/258, 264, 427, 427.1; 700/95, 98, 110, 700/118, 119, 120, 163
See application file for complete search history.

(56) References Cited

U.S. PATENT DOCUMENTS

| | | | | |
|---|---|---|---|---|
| 3,772,725 A * | 11/1973 | Shelstad | ........................ | 15/53.3 |
| 4,201,150 A * | 5/1980 | Edwards | ........................ | 118/323 |
| 5,121,329 A | 6/1992 | Crump | ........................ | 364/468 |
| 5,340,433 A | 8/1994 | Crump | ........................ | 156/578 |
| 5,491,643 A | 2/1996 | Batchelder | ........................ | 364/512 |
| 5,939,008 A | 8/1999 | Comb et al. | ........................ | 264/308 |
| 5,968,561 A * | 10/1999 | Batchelder et al. | ........................ | 425/375 |
| 6,367,791 B1 | 4/2002 | Calderon et al. | ........................ | 269/291 |
| 6,685,866 B2 | 2/2004 | Swanson et al. | ........................ | 264/308 |
| 6,722,872 B1 | 4/2004 | Swanson et al. | ........................ | 425/225 |
| 6,776,602 B2 | 8/2004 | Swanson et al. | ........................ | 425/376.1 |
| 7,127,309 B2 | 10/2006 | Dunn et al. | ........................ | 700/98 |
| 2003/0009258 A1 * | 1/2003 | Conry | ........................ | 700/225 |
| 2004/0104515 A1 * | 6/2004 | Swanson et al. | ........................ | 264/497 |
| 2007/0228590 A1 | 10/2007 | LaBossier et al. | ........................ | 264/40.1 |
| 2007/0228592 A1 | 10/2007 | Dunn et al. | ........................ | 264/40.4 |
| 2008/0317894 A1 | 12/2008 | Turley et al. | ........................ | 425/226 |

* cited by examiner

*Primary Examiner* — Michael Cleveland
*Assistant Examiner* — Alexander Weddle
(74) *Attorney, Agent, or Firm* — Brian R. Morrison; Westman, Champlin & Kelly, P.A.

(57) ABSTRACT

A head mount for use in a digital manufacturing system, where the head mount comprises a first component supported by at least one gantry of the digital manufacturing system, and a second component configured to retain a deposition head of the digital manufacturing system, and to move relative to the first component in response to a load applied to the deposition head from a platform assembly of the digital manufacturing system.

20 Claims, 11 Drawing Sheets

ADJUSTABLE HEAD MOUNT FOR DIGITAL MANUFACTURING SYSTEM

CROSS-REFERENCE TO RELATED APPLICATION(S)

Reference is hereby made to co-pending U.S. patent application Ser. No. 12/255,330, entitled "Adjustable Platform Assembly For Digital Manufacturing System", filed on even date.

BACKGROUND

The present disclosure relates to digital manufacturing systems for building three-dimensional (3D) models. In particular, the present disclosure relates to deposition heads and head gantries for use with digital manufacturing systems, such as deposition-based digital manufacturing systems.

Digital manufacturing systems are used to build 3D models from digital representations of the 3D models (e.g., STL format files) using one or more layer-based additive techniques. Examples of commercially available layer-based additive techniques include fused deposition modeling, ink jetting, selective laser sintering, electron-beam melting, and stereolithographic processes. For each of these techniques, the digital representation of the 3D model is initially sliced into multiple horizontal layers. For each sliced layer, a build path is then generated, which provides instructions for the particular digital manufacturing system to form the given layer. For deposition-based systems (e.g., fused deposition modeling and ink jetting), the build path defines the pattern for depositing roads of modeling material from a moveable deposition head to form the given layer.

For example, in a fused deposition modeling system, modeling material is extruded from a moveable extrusion head, and is deposited as a sequence of roads on a platform in a horizontal x-y plane based on the build path. The extruded modeling material fuses to previously deposited modeling material, and solidifies upon a drop in temperature. The position of the extrusion head relative to the platform is then incremented along a vertical z-axis, and the process is then repeated to form a 3D model resembling the digital representation.

Movement of the underlying platform can require a substantial force load (e.g., up to several hundred pounds), particularly for platforms having large build areas. Such required loads are substantially greater than the forces that the deposition head is typically designed to withstand. Thus, if an error occurs while raising the underlying platform along the vertical z-axis, the platform may overshoot its intended position and potentially damage the deposition head. Accordingly, there is an ongoing need for mechanisms and techniques for reducing the risk of damage to deposition heads from contact with underlying platforms.

SUMMARY

An aspect of the disclosure is directed to a head mount for use in a digital manufacturing system. The head mount includes a first component supported by at least one gantry of the digital manufacturing system, and a second component configured to retain a deposition head of the digital manufacturing system. The second component is further configured to move relative to the first component in response to a load applied to the deposition head from a platform assembly of the digital manufacturing system.

Another aspect of the disclosure is directed to a digital manufacturing system that includes a deposition head configured to deposit at least one modeling material, and a platform assembly configured to operably receive the at least one deposited modeling material, and configured to move substantially along a first axis. The digital manufacturing system further includes a head mount configured to retain the deposition head in a manner that allows the deposition head to move under an applied load from the platform assembly.

A further aspect of the disclosure is directed to a method of operating a digital manufacturing system. The method includes retaining a deposition head of the digital manufacturing system in a head mount of the digital manufacturing system, and moving a platform assembly of the digital manufacturing system in a first direction along a first axis. The method further includes applying a load to the deposition head in the first direction by the movement of the platform assembly in the first direction, and moving the deposition head and at least a portion of the head mount in response to the applied load from the platform assembly.

DETAILED DESCRIPTION

Figure 1:
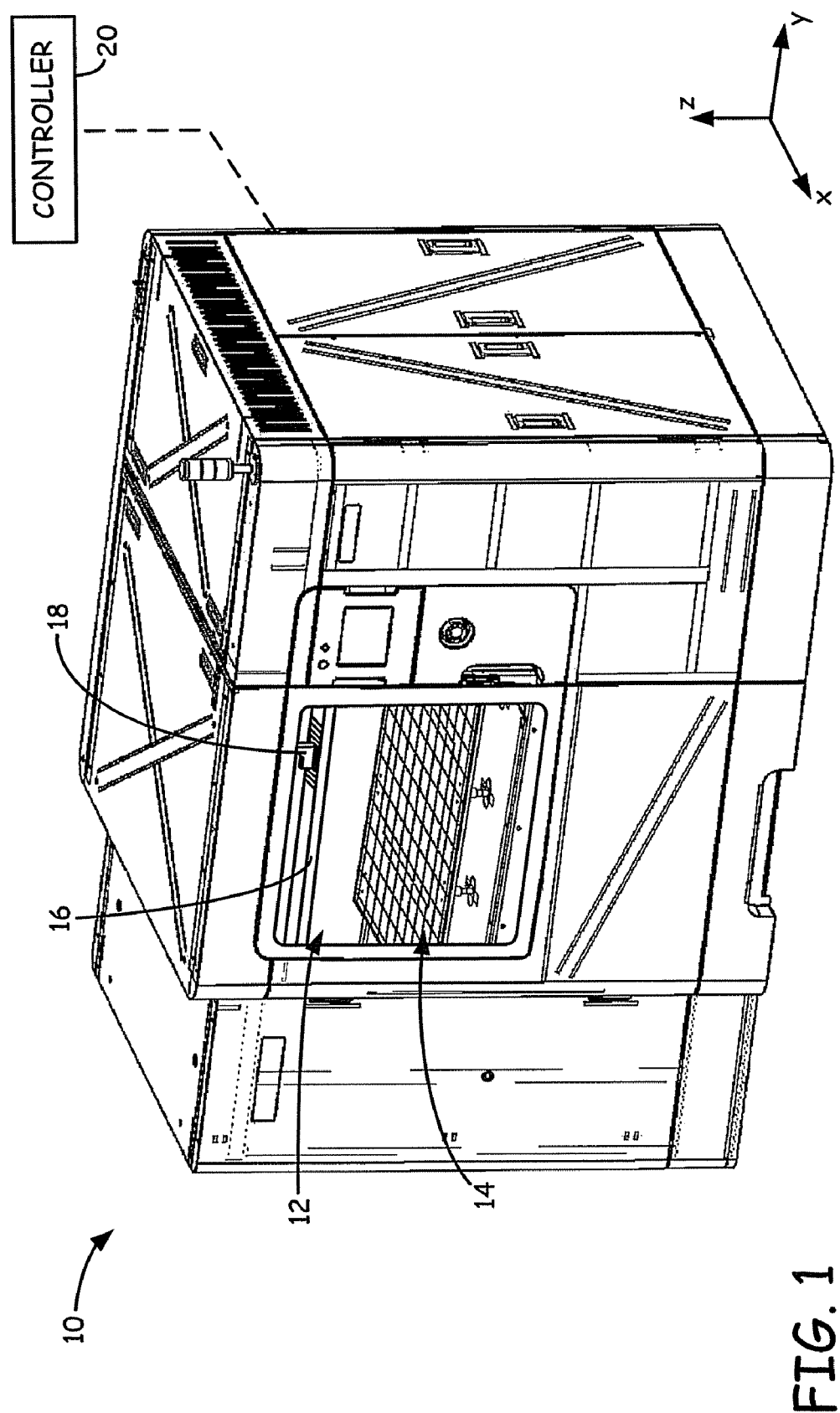
FIG. 1 is a perspective view of a digital manufacturing system.

As shown in FIG. 1, system 10 is a digital manufacturing system that includes build chamber 12, platform assembly 14, head gantry 16, and deposition head 18. System 10 is desirably a deposition-based system, such as an extrusion-based system and/or a jetting system, each of which may build 3D models and corresponding support structures using a layered-based additive technique. Examples of suitable extrusion-based systems for system 10 include fused deposition modeling systems developed by Stratasys, Inc., Eden Prairie, Minn., such as those disclosed in Comb et al., U.S. Pat. No. 5,939,008; Swanson et al., U.S. Pat. Nos. 6,722,872 and 6,776,602.

Build chamber 12 is an enclosed environment that contains platform assembly 14, head gantry 16, and deposition head 18 for building a 3D model (not shown) and a corresponding support structure (not shown). Platform assembly 14 is a receiving platform on which the 3D model and support structure are built, and desirably moves along a vertical z-axis based on signals provided from controller 20. Examples of suitable platforms for use with system 10 include those disclosed in Skubic et al., U.S. Patent Application Publication No. 2010/0100222. Controller 20 is desirably one or more computer-operated controllers for operating system 10, and may be located internally or externally to system 10.

Head gantry 16 is a guide rail system that is desirably configured to move deposition head 18 in a horizontal x-y plane within build chamber 12 based on signals provided from controller 20. The horizontal x-y plane is a plane defined by an x-axis and a y-axis, where the x-axis, the y-axis, and the z-axis are orthogonal to each other. In an alternative embodiment, platform assembly 14 may be configured to move along two axes within build chamber 12 (e.g., x-z plane or the y-z plane), and deposition head 18 may be configured to move along a single horizontal axis (e.g., the x-axis or the y-axis). In an additional alternative embodiment, platform assembly 14 may be configured to move along all three axes, and deposition head 18 may be stationary. Other similar arrangements may also be used such that one or both of platform assembly 14 and deposition head 18 are moveable relative to each other.

Deposition head 18 is supported by head gantry 16 for building the 3D model and support structure on platform assembly 14 in a layer-by-layer manner, also based on signals provided from controller 20. As discussed below, head gantry 16 includes an adjustable head mount (not shown in FIG. 1) configured to retain deposition head 18, and to allow deposition head 18 to be pushed upward when platform assembly 14 contacts deposition head 18. This reduces the risk of damage to deposition head 18.

Suitable deposition heads for use with system 10 include a variety of different deposition-based components, such as extrusion heads, jetting heads, and combinations thereof. Examples of suitable extrusion heads for deposition head 18 include those disclosed in Leavitt et al., U.S. Patent Application Publication No. 2009/0035405. Accordingly, deposition head 18 may deposit one or more modeling and support materials onto platform assembly 14 to build the 3D model and support structure. In alternative embodiments, system 10 may include a variety of different configurations for supplying one or more modeling materials and one or more support materials. Furthermore, system 10 may include a plurality of adjustable head mounts and a plurality of deposition heads 18 for depositing modeling and/or support materials.

In the embodiment shown in FIG. 1, during a build operation, head gantry 16 moves deposition head 18 in the horizontal x-y plane within build chamber 12, and one or more feed mechanisms (not shown) are directed to intermittently feed the modeling and support materials through deposition head 18. The received modeling and support materials are then deposited onto platform assembly 14 to build the 3D model and support structure using a layer-based additive technique. After each layer is complete, platform assembly 14 may be lowered by an increment along the z-axis to allow successive layers to be formed on top of the previously deposited layers.

Prior to performing a build operation, platform assembly 14 is desirably positioned below deposition head 18, along the vertical z-axis, by a calibrated offset distance (e.g., about 0.380 millimeters (about 0.015 inches)). Under proper operation, this offset distance prevents platform assembly 14 from contacting deposition head 18. However, if not calibrated correctly, or in the event of a system error, platform assembly 14 may potentially overshoot its target height and contact deposition head 18. The driving load of platform assembly 14 is sufficient to potentially damage deposition head 18 upon contact. Thus, as discussed below, the use of the adjustable head mount allows deposition head 18 to tilt or otherwise move upward when platform assembly 14 contacts deposition head 18, thereby reducing the load applied to deposition head 18.

Figure 2:
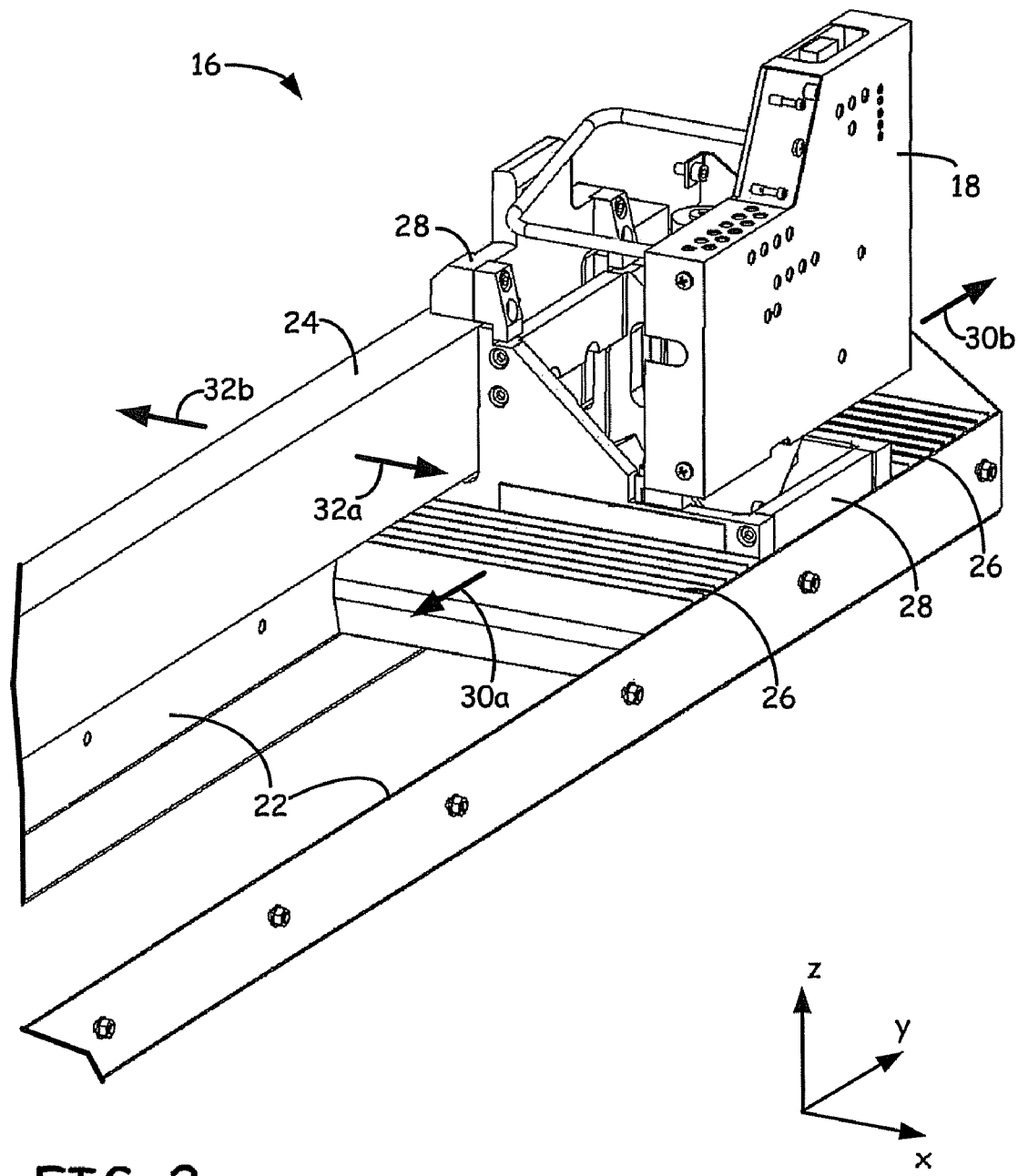
FIG. 2 is a perspective view of a deposition head and head gantry of the digital manufacturing system.
Figure 3:
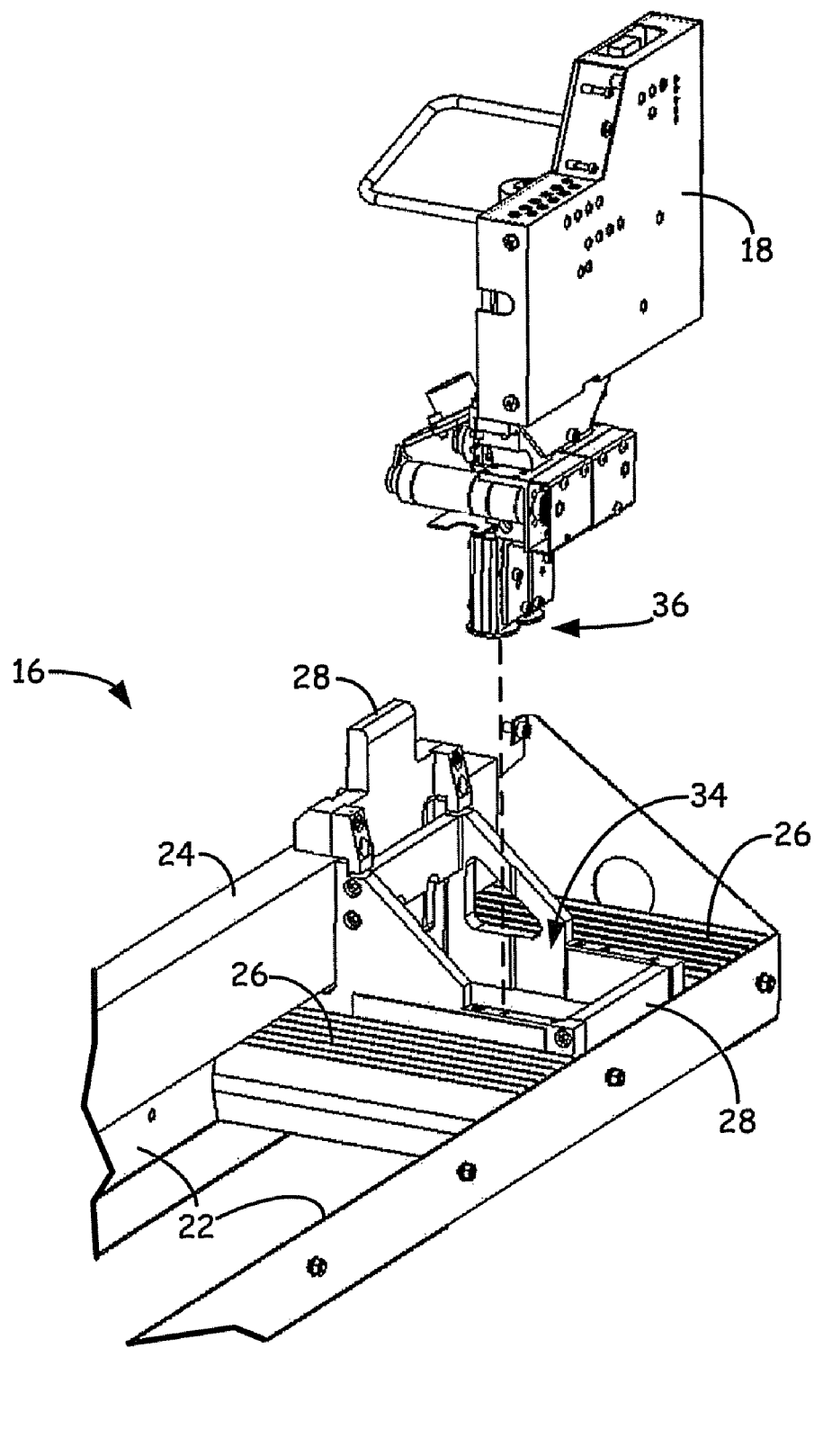
FIG. 3 is an exploded perspective view of the deposition head and the head gantry.

FIGS. 2 and 3, show deposition head 18 in use with head gantry 16, where FIG. 2 illustrates deposition head 18 secured to head gantry 16, and FIG. 3 illustrates deposition head 18 suspended above head gantry 16 in an exploded view arrangement. As shown in FIG. 2, head gantry 16 includes y-bridge 22, y-rail 24, baffles 26, and head mount 28, where head mount 28 is the portion of head gantry 16 that retains deposition head 18. Y-bridge 22 and y-rail 24 are tracks that retain baffles 26 and head mount 28, and that allow baffles 26/head mount 28 to move along the y-axis, as represented by arrows 30a and 30b. Baffles 26 are desirably flexible baffles that insulate the gantry components from the elevated temperature of build chamber 12.

Head gantry 16 also desirably includes additional components (not shown), such as one or more lead screws for driving head mount 28/deposition head 18 along the y-axis. Furthermore, head gantry 16 also desirably includes one or more x-axis components (not shown) configured to move the shown components of head gantry 16 along the x-axis, as represented by arrows 32a and 32b. Examples of suitable gantry designs and arrangements for head gantry 16 include those disclosed in Comb et al., U.S. Pat. No. 5,939,008; Batchelder et al., U.S. Pat. No. 5,968,561; and Swanson et al., U.S. Pat. No. 6,776,602.

Head mount 28 is an adjustable head mount configured to securely retain deposition head 18 while moving around the x-y plane during a build operation. Thus, head mount 28 desirably retains deposition head 18 in a secure manner, thereby preventing deposition head 18 from shaking or otherwise moving relative to head mount 28. This is beneficial for preserving deposition accuracy in the x-y plane. Furthermore, head mount 28 is also configured to allow deposition head 18 to tilt or otherwise move upward when pushed from below by platform assembly 14 (shown in FIG. 1). As discussed above, this reduces the risk of damaging deposition head 18 in the event that platform assembly 14 contacts deposition head 18. Head mount 28 also desirably allows deposition head 18 to move back downward to a repeatable position along the vertical z-axis, which is desirable to substantially preserve the calibration along the z-axis.

As shown in FIG. 3, during installation, a portion of deposition head 18 may be inserted through central slot 34 of head mount 28 such that deposition tips 36 of deposition head 18 extend below head gantry 16. This allows deposition head 18 to be securely retained by head mount 28 without obstructing the use of deposition tips 36 during a build operation. Deposition head 18 may be supported by, and secured to head mount 18 in a variety of conventional manners (e.g., mechanical fasteners). The mechanisms also desirably allow deposition head 18 to be readily removed from head mount 28 for repair and/or replacement.

Figure 4:
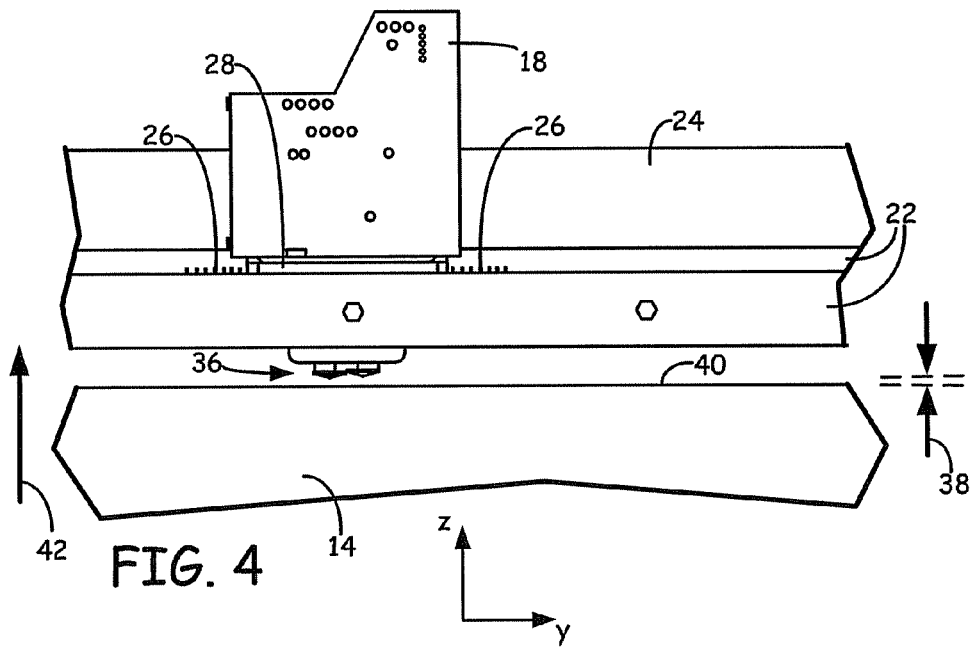
FIG. 4 is an expanded front view of the deposition head, the head gantry, and a platform assembly of the digital manufacturing system.

FIG. 4 shows deposition head 18 disposed above platform assembly 14 by offset distance 38, where offset distance 38 is desirably a predetermined distance that one or both of platform assembly 14 and deposition head 18 are calibrated to before performing a build operation. In the shown embodiment, offset distance 38 is a distance between one or more of deposition tips 36 and top surface 40 of platform assembly 14, where top surface 40 may be a platform surface, a film substrate surface, and the like. In an extrusion-based digital manufacturing systems, suitable average distances for offset distance 38 may range from about 0.250 millimeters (about 0.010 inches) to about 0.510 millimeters (about 0.020 inches). While described herein as an average distance between one or both of deposition tips 36 and top surface 40, offset distance 38 may alternatively be a predetermined distance between any components of platform assembly 14, and head gantry 16/deposition head 18, and may vary depending on the designs of platform assembly 14 and deposition head 18.

During a build operation, platform assembly 14 is desirably raised upward along the vertical z-axis (represented by arrow 42) until top surface 40 is positioned below deposition tips 36 by offset distance 38. As shown, offset distance 38 is relatively small compared to the overall dimensions of build chamber 12 and platform assembly 14. Thus, if an error occurs (e.g. calibration error), platform assembly 14 may overshoot this desired height while rising upward along the z-axis, and may contact deposition tips 36. Because the load required to raise platform assembly 14 may be substantially greater than the force that deposition head 18 is designed to withstand (e.g., more than 100 times greater), the upward movement may potentially damage one or more portions of deposition head 18. This would require repair or replacement of deposition head 18 before any additional build operation may be performed.

Figure 5:
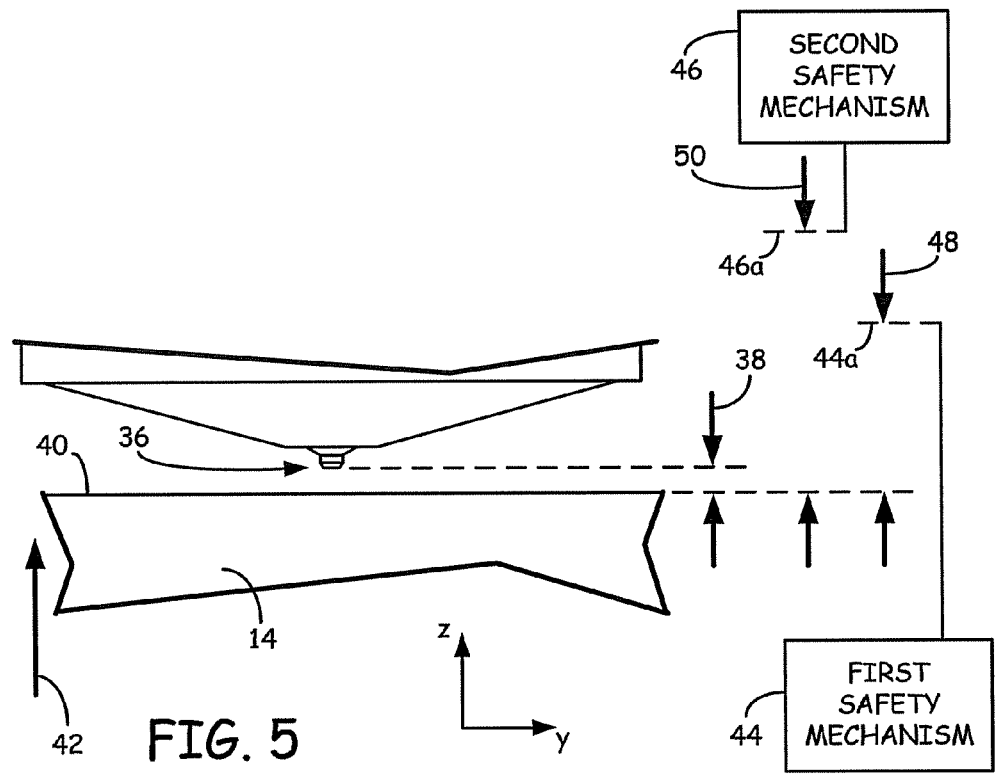
FIG. 5 is an expanded front view of a deposition tip of the deposition head and the platform assembly.

As shown in FIG. 5, system 10 desirably includes one or more additional safety mechanisms to inhibit platform assembly 14 from moving further upward above certain points along the z-axis. This desirably prevents platform assembly 14 from contacting head gantry 16 and the ceiling portion of build chamber 12 (not shown). For example, system 10 may include first safety mechanism 44 at a first height along the z-axis (referred to as height location 44a), and second safety mechanism 46 at a second height along the z-axis (referred to as height location 46a), where height location 46a is vertically higher along the z-axis than height location 44a. This arrangement provides a two-tier safety mechanism in the event that first safety mechanism 44 fails to stop platform assembly 14.

First safety mechanism 44 is desirably one or more electronic-based stops, such as optical-based sensors, contact-switch sensors, and combinations thereof, each of which may provide signals to controller 20 to cut off power or otherwise halt the upward movement of platform assembly 14. If platform assembly 14 overshoots its calibrated position and reaches height location 44a, the electronic-based stop desirably signals controller 20 to cut off power or otherwise halt the upward movement of platform assembly 14. The use of an electronic-based stop is desirable to prevent physical contact between platform assembly 14 and a physical stop, which may potentially damage platform assembly 14.

Second safety mechanism 46 is desirably one or more physical stops, such as hard stops (e.g., reinforced rubber guards) that physically prevent platform assembly 14 from moving further upward. In the event of a software or electronic system malfunction, the electronic-based stop at height location 44a may not necessarily function correctly to stop platform assembly 14 from moving upward along the z-axis. Thus, second safety mechanism 46 may be a hard stop (e.g., one or more reinforced rubber guards) that physically prevents platform assembly 14 from further upward movement beyond height location 46a. The hard stop(s) at height location 46a may also be combined with a torque sensor that monitors the amount of motor power required to raise platform assembly 14. If the required amount of motor power to raise platform assembly 14 increases above a threshold, such when the hard stop at height location 46a is reached, controller 20 may cut off power to the motor, thereby preventing platform assembly 14 from being forced upward along the z-axis.

While first and second safety mechanisms 44 and 46 are suitable for reducing the risk of damage to head gantry 16 and/or the ceiling portion of build chamber 12, height locations 44a and 46a are desirably located higher along the z-axis relative to the average height of deposition tips 36. This prevents first and second safety mechanisms 44 and 46 from interfering with the operation of platform assembly 14 and deposition head 18 during build operations.

Suitable heights along the z-axis for the locations of the safety mechanisms include heights of at least about 1.3 millimeters (about 0.05 inches) to about 5.1 millimeters (about 0.20 inches) above the average height of deposition tips 36. For example, locations 44a and 46a may be positioned at heights of about 1.52 millimeters (about 0.060 inches) and about 3.30 millimeters (about 0.130 inches), respectively, above the average height of deposition tips 36. In an example in which offset distance 38 is about 0.380 millimeters (about 0.015 inches), this positioning places first safety mechanisms 44 above top surface 40 of platform assembly 14 by a distance (referred to as distance 48) of about 2.16 millimeters (about 0.085 inches), and places second safety mechanisms 46 above top surface 40 by a distance (referred to as distance 50) of about 3.68 millimeters (about 0.145 inches).

Accordingly, to reduce the risk of damage to deposition head 18 in the event that top surface 40 contacts deposition tips 36, head mount 28 desirably allows deposition head 18 to move upward (e.g., tilt upward) to a height along the z-axis that is greater than the height of at least one safety mechanism of system 10. This allows deposition head 18 to be pushed upward by platform assembly 14 until platform assembly 14 reaches the location of a first safety mechanism (e.g., first safety mechanism 44 at height location 46a). As used herein, the term "safety mechanism" refers to a mechanism that is configured to prevent a platform assembly (e.g., platform assembly 14) from moving upward above a given point along the vertical z-axis, such as an electronic-based stop and a physical stop.

Furthermore, head mount 28 more desirably allows deposition head 18 to move upward to a height along the z-axis that is greater than the heights of a plurality of the safety mechanisms of system 10 (e.g., all of the safety mechanisms of system 10). Thus, in the embodiment shown in FIG. 4, deposition head 18 may tilt upward to a height along the z-axis that is greater than the height of second safety mechanism 46 at height location 46a. This reduces the risk of damage to deposition head 18 by allowing deposition head 18 to move upward until platform assembly 14 reaches one or more of the safety mechanisms.

Figure 6:
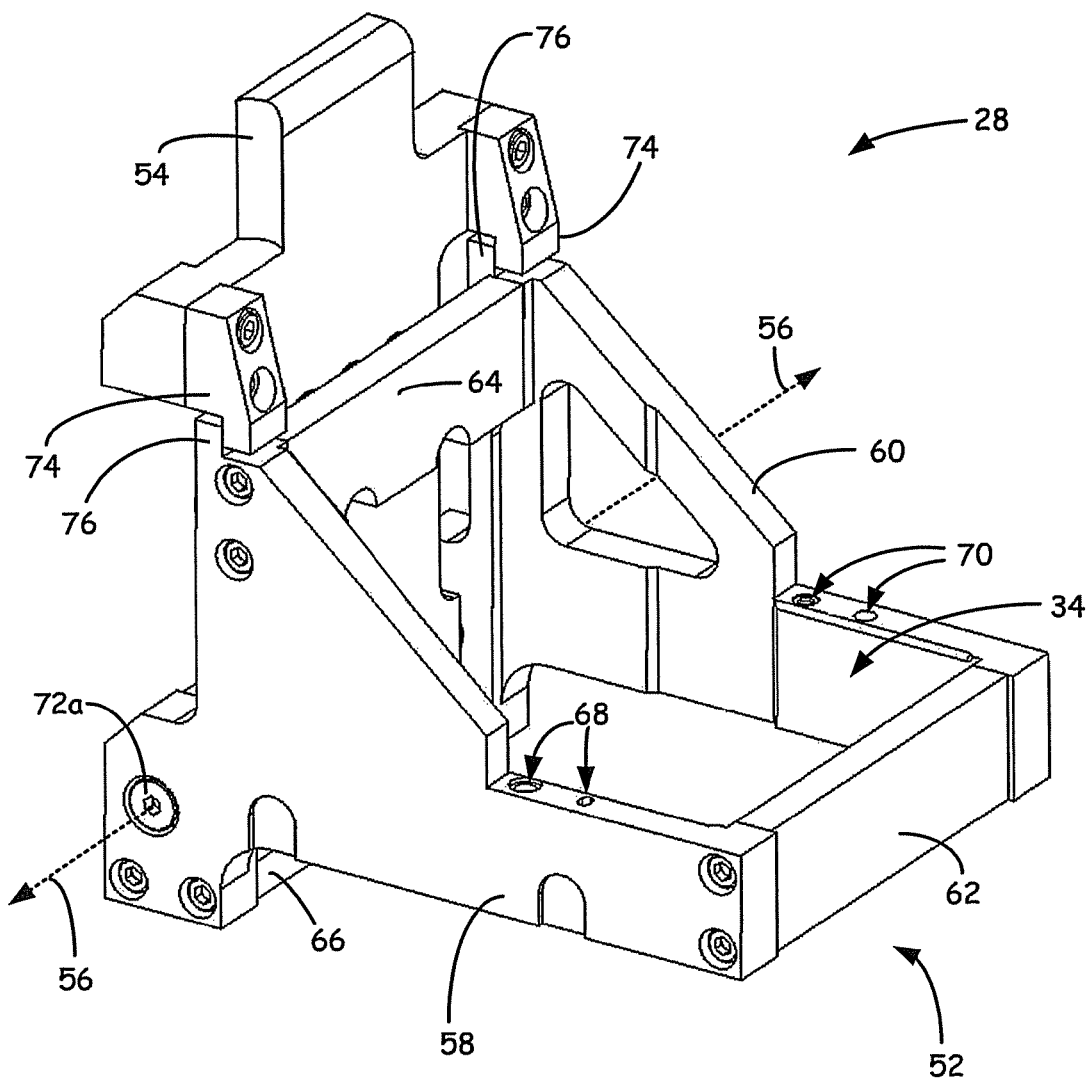
FIG. 6 is a front perspective view of a head mount of the head gantry.
Figure 7:
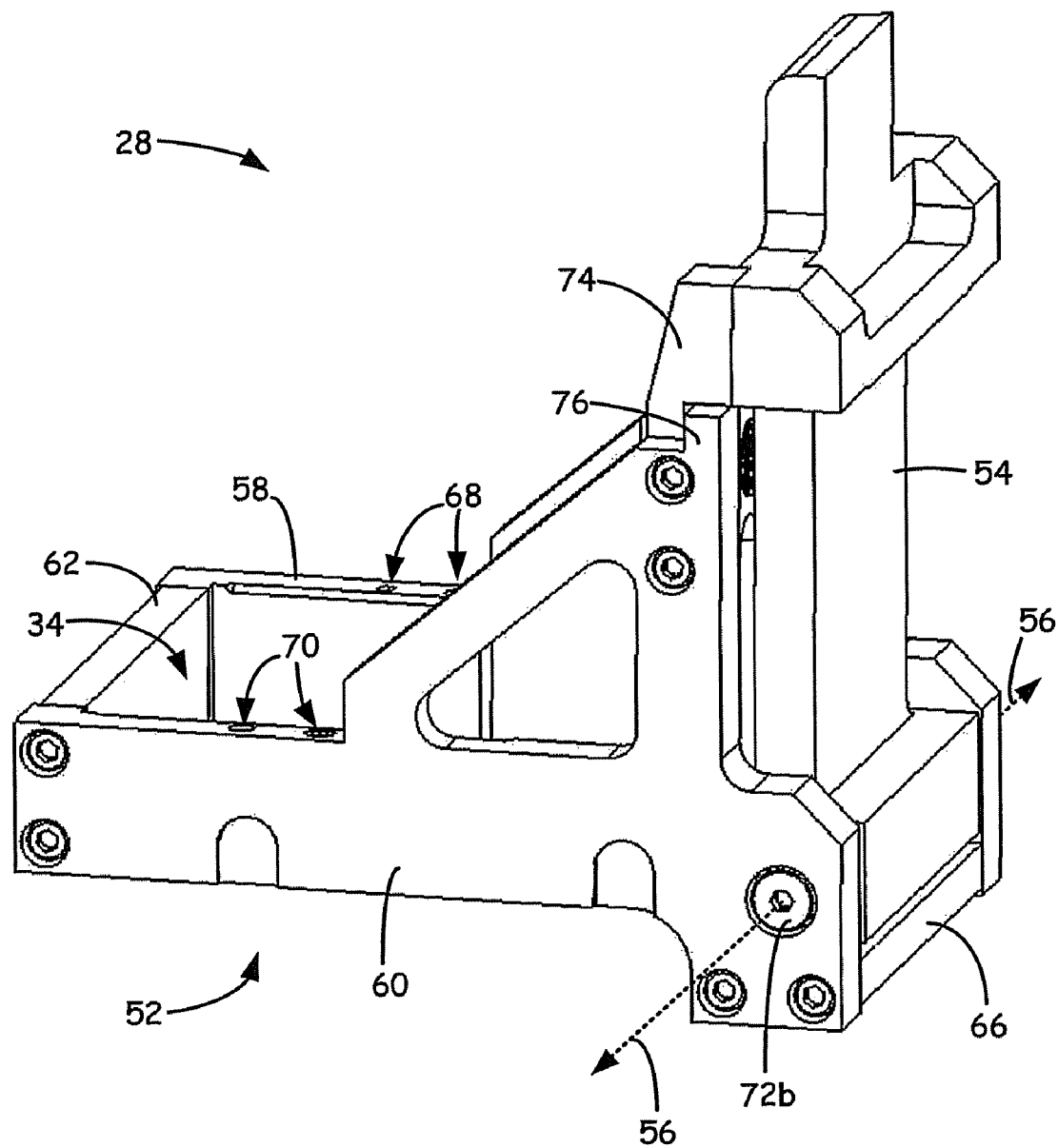
FIG. 7 is a rear perspective view of the head mount.

FIGS. 6-10, 11A, and 11B illustrate an exemplary embodiment for head mount 28, which is configured to pivot deposition head 18 upward in response to a load applied to deposition head 18 from platform assembly 14. As shown in FIGS. 6 and 7, head mount 28 includes bracket member 52 and bearing plate 54, where bracket member 52 is configured to pivot along pivot axis 56 relative to bearing plate 54. Head mount 58 may also include a variety of additional components (not shown) for engaging head mount 58 with one or more portions of baffles 26 and/or head gantry 16. In the shown embodiment, bracket member 52 is the portion of head mount 28 that retains deposition head 18 through central slot 34, and includes left bracket 58, right bracket 60, front cross plate 62, rear cross plate 64, and base cross plate 66. Left bracket 58 and right bracket 60 are secured in an offset manner along the y-axis with the use of front cross plate 62, rear cross plate 64, and base cross plate 66, thereby desirably forming a rigid structure that defines central slot 34.

Left bracket 58 and right bracket 60 respectively include pin/slot components 68 and 70, which allow deposition head 18 to be aligned with, and secured to bracket member 52. This prevents deposition head 18 from shaking or otherwise moving relative to bracket member 52. Left bracket 58 and right bracket 60 are pivotally connected to bearing plate 54 with bolt 72a and bolt 72b (shown in FIG. 7), thereby allowing bracket member 52 to pivot around pivot axis 56. As discussed below, this correspondingly allows deposition head 18 to tilt upward when pushed by top surface 40 of platform assembly 14. Bearing plate 54 is the portion of head mount 28 that engages y-rail 24 of head gantry 16, which directs head mount 28 and deposition head 18 to slide along y-rail 24.

Head mount 28 also includes a pair of bearing hooks 74 secured to bearing plate 54, where bearing hooks 74 are configured to engage with reciprocating hook extensions 76 of left bracket 58 and right bracket 60. As discussed below, hook extensions 76 are configured to pivot with bracket member 52, and engage with bearing hooks 74 when bracket member 52 and deposition head 18 are in a resting state (i.e., not tilted upward by platform assembly 14).

Figure 8:
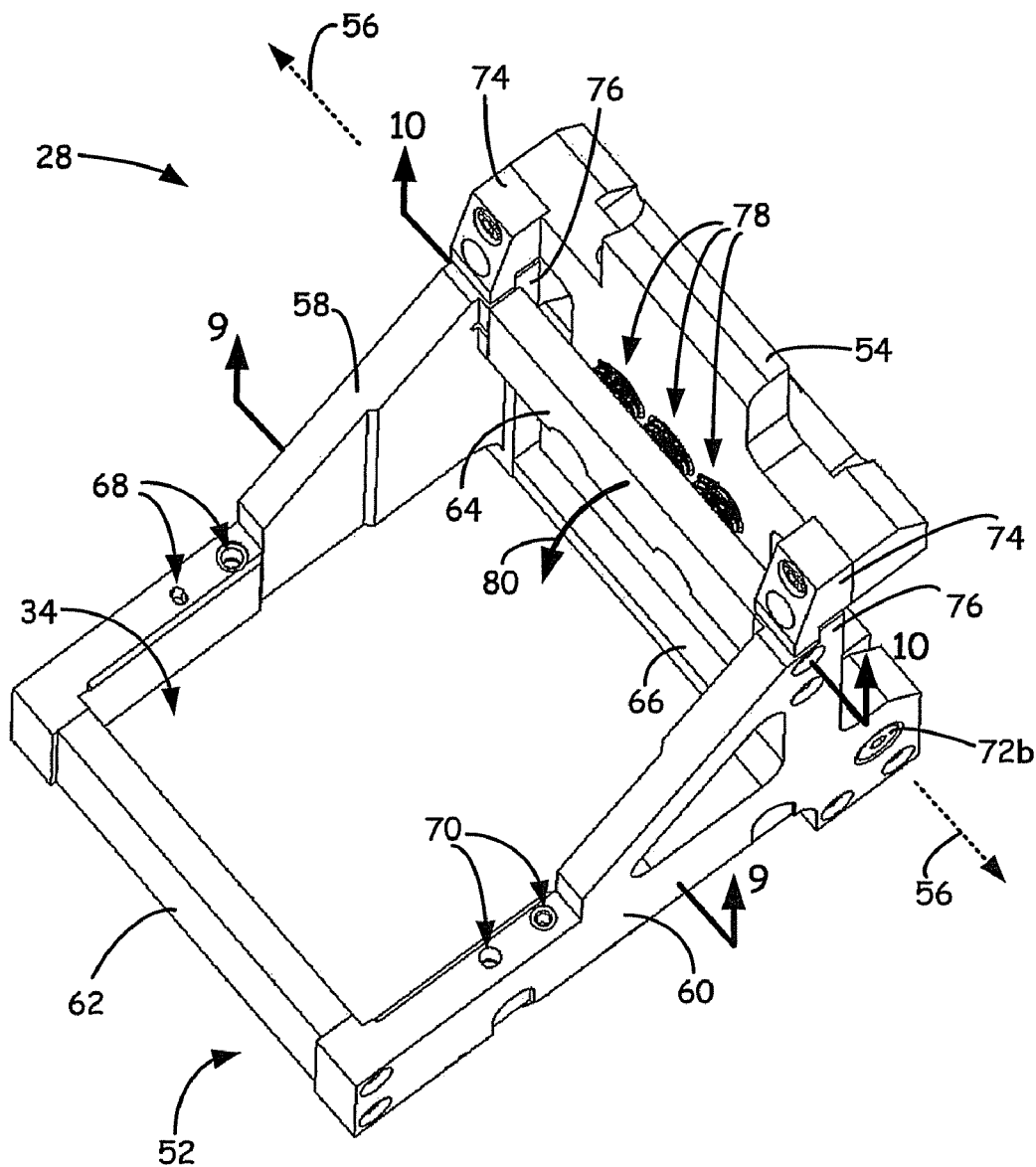
FIG. 8 is a top perspective view of the head mount.

As shown in FIG. 8, head mount 28 also includes springs 78, which are biasing components secured between bearing plate 54 and rear cross plate 64. Springs 78 are pre-biased to force rear cross plate 64 away from bearing plate 54, thereby allowing bracket member 52 to pivot along pivot axis 56 (as represented by arrow 80) until hook extensions 76 engage bearing hooks 74. In alternative embodiments, springs 78 may be replaced with a variety of different biasing components configured to bias one or more portions of bracket member 52 relative to bearing plate 54.

Figure 9:
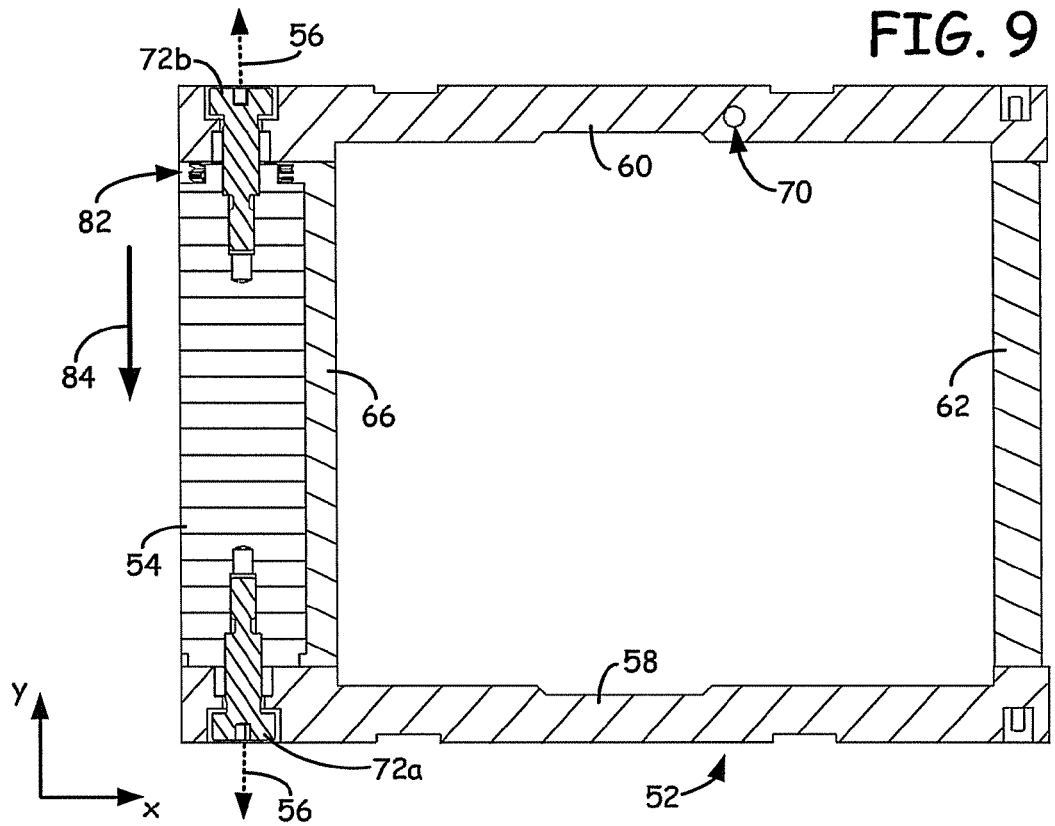
FIG. 9 is a sectional view of section 9-9 taken in FIG. 8, illustrating a pivot axis of the head mount.
Figure 10:
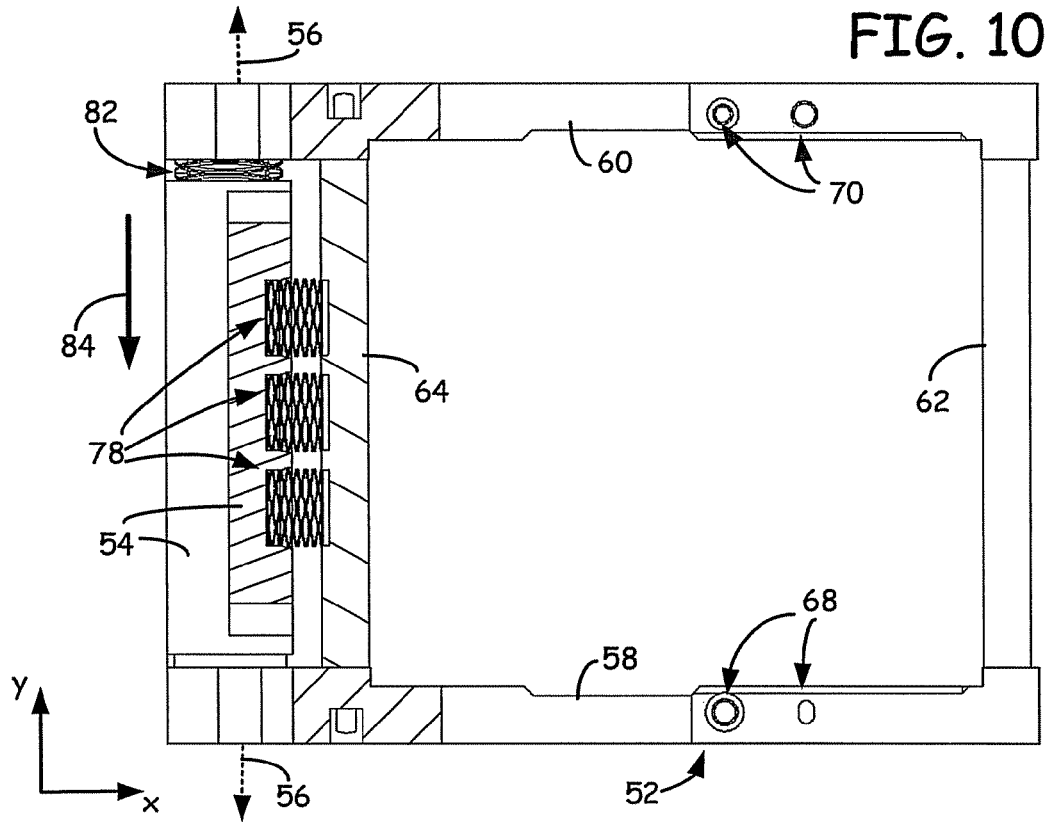
FIG. 10 is a sectional view of section 10-10 taken in FIG. 7, illustrating biasing components of the head mount.

FIGS. 9 and 10 are respective sectional views of sections 9-9 and 10-10 taken in FIG. 8. As shown in FIGS. 9 and 10, head mount 28 further includes thrust washer 82, which, in the shown embodiment, extends around bolt 72b and biases base cross plate 66 away from right bracket 60, as represented by arrow 84. As discussed above, head mount 28 desirably restricts lateral movement of deposition head 18 relative to head mount 28 to preserve deposition accuracy in the x-y plane. The biasing force of thrust washer 82 is suitable for restraining bracket member 52 against bearing plate 54 along the y-axis, while also allowing bracket member 52 to pivot around pivot axis 56 under the biasing force of springs 78. In an alternative embodiment, thrust washer 82 may extend around bolt 72a to bias base cross plate 66 away from left bracket 58. In additional alternative embodiments, thrust washer 82 may be replaced with a variety of different mechanisms that reduce the lateral movement of bracket member 52 relative to bearing plate 54 along the y-axis, while also allowing bracket member 52 to pivot around pivot axis 56.

Figure 11A:
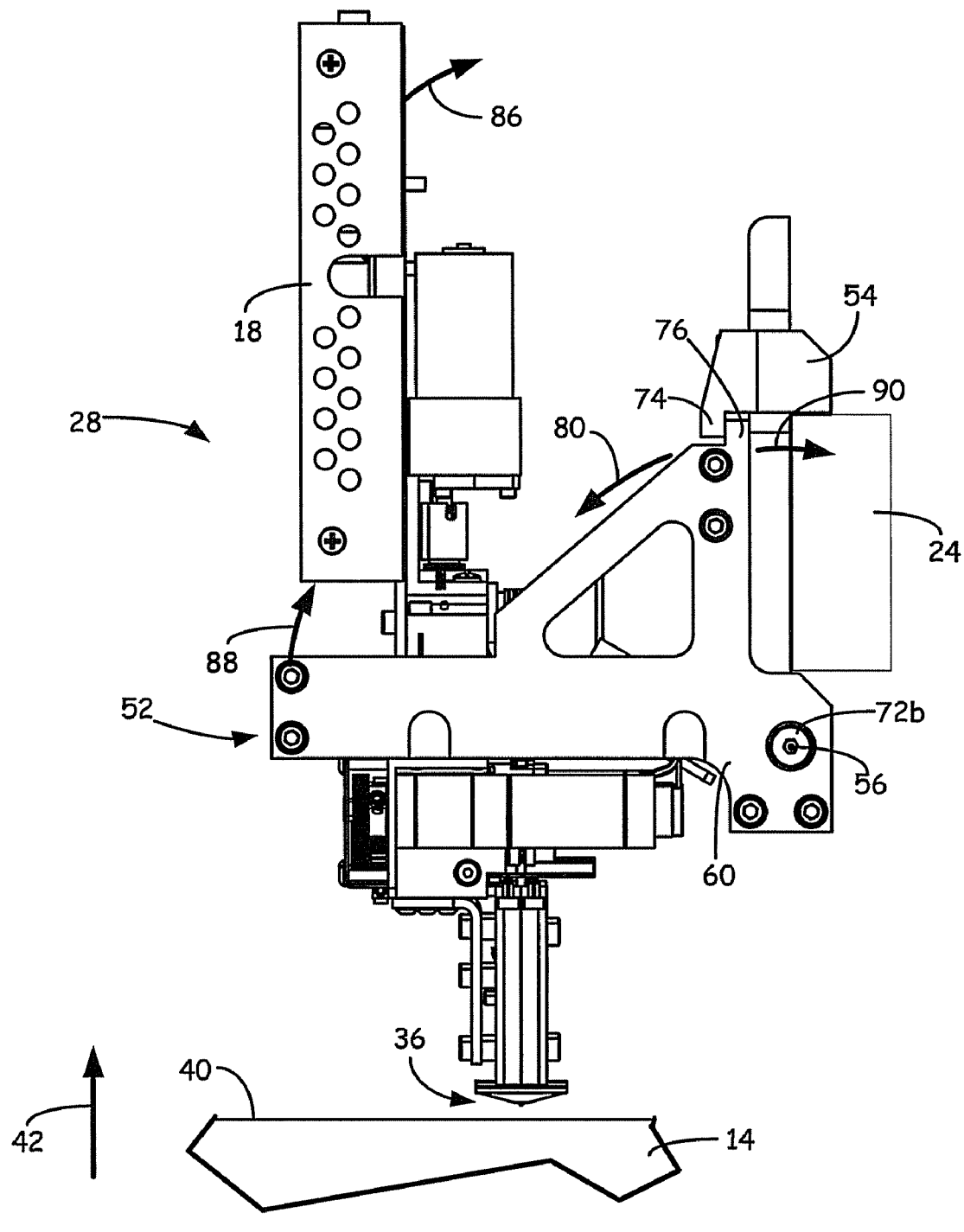
FIG. 11A is a side view of the deposition head and the head mount in a resting state above the platform assembly.
Figure 11B:
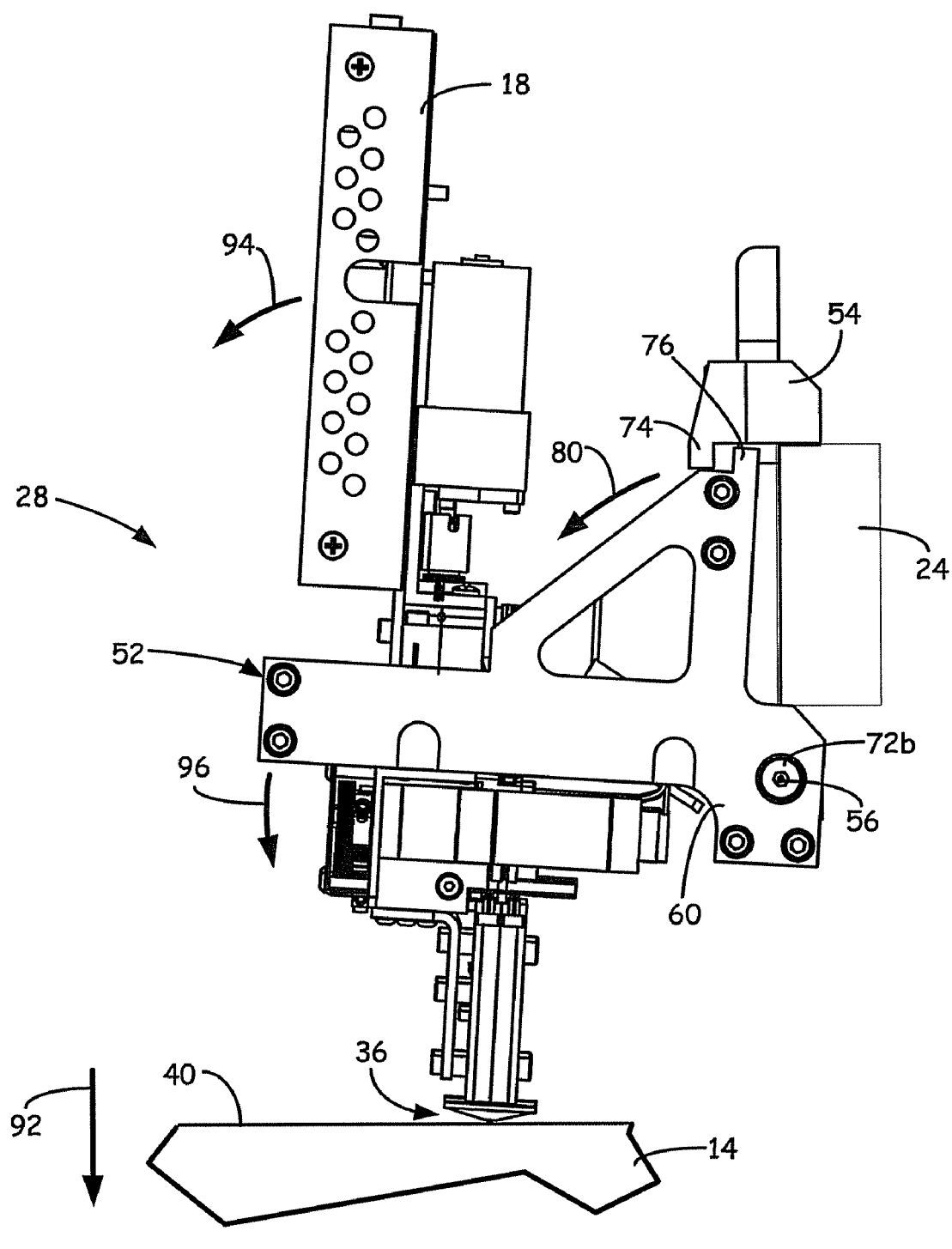
FIG. 11B is a side view of the deposition head and the head mount being tilted upward by contact with the platform assembly.

FIGS. 11A and 11B are side views of deposition head 18 secured to head mount 28, which illustrate the tilting of deposition head 18 and head mount 28 around pivot axis 56. As shown in FIG. 11A, springs 78 (shown in FIGS. 8 and 10) bias bracket member 52 around pivot axis 56 in the direction of arrow 80. Accordingly, deposition head 18 and bracket member 52 pivot around pivot axis 56 until hook extensions 76 of bracket member 52 contact and engage bearing hooks 74. This engagement prevents further pivoting of deposition head 18 and bracket member 52 in the direction of arrow 80, and desirably orients deposition head 18 at a repeatable position in the horizontal x-y plane. This correspondingly orients deposition tips 36 of deposition head 18 vertically downward along the z-axis for depositing build and support materials.

In the event that platform assembly 14 moves upward along the z-axis (represented by arrow 42) and overshoots its calibrated height, top surface 40 may contact deposition tips 36 of deposition head 18. The continued upward movement of platform assembly 14 counters the biasing force of springs 78 and causes deposition head 18 and bracket member 52 to tilt upward, thereby pivoting around pivot axis 56, as represented by arrows 86 and 88. This correspondingly causes hook extensions 76 to disengage and pivot away from bearing hooks 74, as represented by arrow 90. Accordingly, platform assembly 14 may continue to tilt deposition head 18 and bracket member 52 upward until one or more safety mechanisms of system 10 (e.g., first and second safety mechanisms 44 and 46) are reached.

As discussed above, bracket member 52 is desirably configured to pivot around pivot axis 56 until at least one safety mechanism of system 10 is reached. Thus, the range of motion for hook extensions 76 along the x-axis (e.g., between bearing hooks 74 and y-rail 24) is desirably greater than the range of movement of platform assembly 14 along the z-axis between the desired stopping point and the one or more safety mechanisms. Suitable ranges of motion for deposition head 18 and bracket member 52 may vary depending on a variety of factors, such as the dimensions of head gantry 16, deposition head 18, and head mount 28, and the locations of the safety mechanism(s) of system 10 along the z-axis. Examples of suitable pivot angles for deposition head 18 and bracket member 52 around pivot axis 56 include angles up to about 45 degrees from the resting position, with particularly suitable pivot angles ranging from about 5 degrees to about 30 degrees from the resting position.

FIG. 11B shows deposition head 18 and bracket member 52 titled upward at a point at which platform assembly 14 has reached a safety mechanism of system 10 (e.g., first and second safety mechanisms 44 and 46). As shown, the location of platform assembly 14 tilts deposition head 18 and bracket member 52 upward along the z-axis, which reduces the load applied to deposition head 18. If platform assembly 14 is stopped by the safety mechanism of system 10, the position of platform assembly 14 may hold deposition head 18 and bracket member 52 at the shown tilted position. An operator of system 10 may then lower platform assembly 14 downward along the z-axis (represented by arrow 92). This relieves the load applied to deposition head 18 and bracket member 52, thereby allowing springs 78 to bias rear cross plate 64 away from bearing plate 54 in the direction of arrow 80, as discussed above. This pivots deposition head 18 and bracket member 52 around pivot axis 56, as represented by arrows 94 and 96.

When platform assembly 14 is lowered enough, hook extensions 76 reengage with bearing hooks 74, which prevent further pivoting of bracket member 52, and desirably returns deposition head 18 back at its original position. Thus, head mount 28 desirably allows deposition head 18 to move back downward to a repeatable position along the vertical z-axis to substantially preserve the calibration along the z-axis. In situations in which deposition head 18 remains undamaged after contact with platform assembly 14, the build operation may then commence or continue to build one or more 3D models and corresponding support structures. Accordingly, head mount 28 is suitable for reducing the risk of damage to deposition head 18, which correspondingly reduces operational costs for repairing deposition-based digital manufacturing systems (e.g., system 10).

Figure 12:
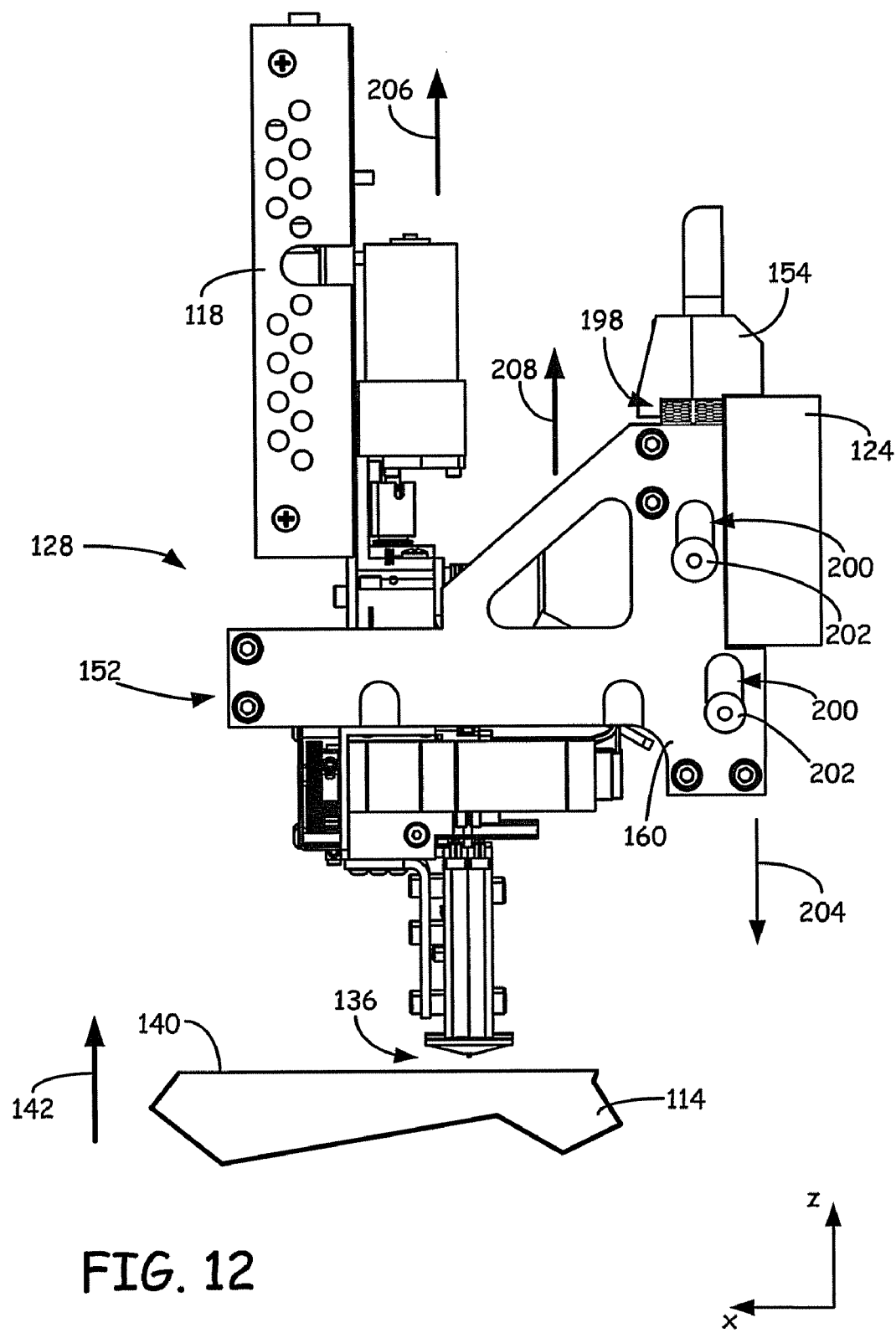
FIG. 12 is a side view of the deposition head and an alternative head mount of the head gantry.

FIG. 12 is a side view of head mount 128, which is an alternative to head mount 28, and respective reference labels are increased by "100". As shown in FIG. 12, head mount 128 is configured to allow deposition head 118 to move upward in a substantially linear manner along the z-axis in response to the load applied from platform assembly 114. Head mount 128 includes springs 198, guide slots 200, and pins 202, where springs 198 are biasing members that bias bracket member 152 downward from bearing plate 154 along the z-axis, as represented by arrow 204. Pins 202 extend through guide slots 200, thereby slidably securing bracket member 152 to bearing plate 154. Accordingly, the movement of pins 202 through guide slots 200 limit the movement of bracket member 152 to a substantially linear pathway along the z-axis. Thus, when platform assembly 114 contacts and pushes deposition head 118 upward, the applied load counters the biasing force of springs 198, thereby moving deposition head 118 and bracket member 152 upward along the z-axis, as represented by arrows 206 and 208.

The engagement of pins 202 within guide slots 200 also limits the range of movement of deposition head 118 and bracket member 152 along the z-axis. Accordingly, bracket member 152 is desirably configured to move upward along the z-axis until at least one safety mechanism of system 110 is reached. Suitable ranges of motion for deposition head 118 and bracket member 152 may vary depending on a variety of factors, such as the dimensions of head gantry 116, deposition head 118, and head mount 128, and the locations of the safety mechanism(s) of system 110 along the z-axis. The engagement of pins 202 within guide slots 200 also desirably allows deposition head 118 to move back downward to a repeatable position along the vertical z-axis to substantially preserve the calibration along the z-axis. Thus, head mount 128 is suitable for reducing the risk of damage to deposition head 118. Head mounts 28 and 128 are examples of a variety of different head mount mechanisms that may be used to allow deposition heads (e.g., deposition heads 18 and 118) to move upward in response to loads applied from platform assemblies (e.g., platform assemblies 14 and 114), and to move back downward to repeatable positions along the z-axis.

Although the present disclosure has been described with reference to preferred embodiments, workers skilled in the art will recognize that changes may be made in form and detail without departing from the spirit and scope of the disclosure.

The invention claimed is:

1. A head mount for use in a digital manufacturing system that builds three-dimensional models using a layer-based additive technique, the head mount comprising:
   a bearing member configured to be mounted to a head gantry of the digital manufacturing system, wherein the bearing member comprises a bearing hook;
   a bracket member configured to retain a deposition head of the digital manufacturing system, wherein the bracket member is movably connected to the bearing member, and wherein the bracket member comprises a hook extension; and
   at least one biasing component secured between the bearing member and the bracket member to bias the bracket member away from the bearing member so as to engage the hook extension of the bracket member with the bearing hook of the bearing member, wherein the bracket member is moveable against the bias to disengage the hook extension from the bearing hook in response to a load applied to the deposition head from a platform assembly of the digital manufacturing.

2. The head mount of claim 1, wherein the moveable connection between the bracket member and the bearing member comprises a pivot connection around a pivot axis.

3. The head mount of claim 2, and further comprising a second biasing component secured between the bearing member and the bracket member to bias the bracket member relative to the bearing member along an axis that is different from the bias of the at least one biasing component.

4. The head mount of claim 1, wherein the at least one biasing component comprises at least one pre-biased spring.

5. The head mount of claim 4, wherein the engagement of the hook extension of the bracket member with the bearing hook of the bearing member causes the deposition head to attain a substantially repeatable position along an axis of movement of the platform assembly.

6. The head mount of claim 1, wherein the platform assembly is configured to move along a vertical axis, and wherein the load applied to the deposition head from the moveable platform assembly is substantially along the vertical axis.

7. The head mount of claim 1, wherein the bearing hook is a first bearing hook and the hook extension is a first hook extension, wherein the a bearing further comprises a second bearing hook, and the bracket member further comprises a second hook extension, and wherein the bracket member is moveable against the bias to also disengage the second hook extension from the second bearing hook.

8. A head mount for use in a digital manufacturing system that builds three-dimensional models using a layer-based additive technique, the head mount comprising:
   a bearing member configured to be mounted to a head gantry of the digital manufacturing system, the bearing member comprising at least one bearing hook;
   a bracket member configured to retain a deposition head of the digital manufacturing system, the bracket member comprising at least one hook extension, wherein the bracket member is pivotally connected to the bearing member; and
   at least one biasing component secured between the bearing member and the bracket member to bias the bracket member away from the bearing member so as to engage the at least one hook extension of the bracket member with the at least one bearing hook of the bearing member, wherein the bracket member is configured to pivot relative to the bearing member along a pivot axis when a load is applied to the deposition head to disengage the at least one hook extension apart from the at least one bearing hook.

9. The head mount of claim 8, wherein the bracket member further comprises:
   a first lateral bracket;
   a second lateral bracket opposite of the first lateral bracket;
   a front cross plate connecting the first and second lateral brackets; and
   a rear cross plate connecting the first and second lateral brackets, and opposite of the front cross plate, wherein the rear cross plate includes the first portion of the bracket member, and wherein the first and second lateral brackets and the front and rear cross plates define a central slot through which the deposition head is configured to at least partially extend.

10. The head mount of claim 9, wherein the bracket member further comprises a base cross plate at which the bracket member is pivotally connected to the bearing member.

11. The head mount of claim 9, wherein the first and second lateral brackets each comprise at least one slot configured to receive and securely retain the deposition head to the first and second lateral brackets.

12. The head mount of claim 8, wherein the at least one first biasing component comprises at least one pre-biased spring.

13. The head mount of claim 8, and further comprising at least one second biasing component secured between the bearing member and the bracket member to bias the bracket member relative to the bearing member in a direction that is substantially parallel to the pivot axis.

14. The head mount of claim 8, wherein the load applied to the deposition head comprises an upward-directed vertical load.

15. A method of operating a digital manufacturing system, the method comprising:
    retaining a deposition head of the digital manufacturing system in a head mount of the digital manufacturing system, wherein the head mount comprises a bearing member secured to a head gantry of the digital manufacturing system and a bracket member movably connected to the bearing member, and wherein the deposition head is retained by the bracket member;
    engaging a hook extension of the bracket member with a bearing hook of the bearing member with at least one biasing component that is disposed between the bearing member and the bracket member such that the bracket member is biased in a substantially repeatable position along a vertical axis;
    moving a platform assembly of the digital manufacturing system in an upward direction along the vertical axis;
    applying a load to the deposition head in the upward direction by the movement of the platform assembly in the upward direction; and
    moving the deposition head and the bracket member against the bias in response to the applied load from the platform assembly, wherein moving the bracket member against the bias disengages the hook extension of the bracket member from the bearing hook of the bearing member.

16. The method of claim 15, wherein moving the bracket member in response to the applied load from the platform assembly comprises pivoting the bracket member around a pivot axis.

17. The method of claim 16, and further comprising biasing the bracket member relative to the bearing member in a direction that is substantially parallel to the pivot axis.

18. The method of claim 15, and further comprising restricting a range of movement of the platform assembly in the upward direction with at least one safety mechanism.

19. The method of claim 18, wherein moving the deposition head in response to the applied load from the platform assembly comprises moving the deposition head to a height along the vertical axis that is outside of the range of movement of the platform assembly.

20. The method of claim 15, and further comprising:
    moving the platform assembly in a downward direction along the vertical axis to remove the load from the deposition head; and
    re-biasing the deposition head to a substantially repeatable position along the vertical axis.

* * * * *